(12) United States Patent
Rentzsch

(10) Patent No.: US 7,057,162 B2
(45) Date of Patent: Jun. 6, 2006

(54) APPARATUS AND METHOD FOR POSITIONING AN OPTICAL COMPONENT

(75) Inventor: Wolfgang Rentzsch, Wetzlar (DE)

(73) Assignee: Leica Microsystems Wetzlar GmbH, Wetzler (DE)

( * ) Notice: Subject to any disclaimer, the term of this patent is extended or adjusted under 35 U.S.C. 154(b) by 185 days.

(21) Appl. No.: 10/669,554

(22) Filed: Sep. 25, 2003

(65) Prior Publication Data

US 2004/0061861 A1 Apr. 1, 2004

(30) Foreign Application Priority Data

Sep. 26, 2002 (DE) ................. 102 45 170

(51) Int. Cl.
  *G01D 5/34* (2006.01)
  *G01B 11/14* (2006.01)
  *G02B 7/02* (2006.01)
(52) U.S. Cl. .............. 250/231.14; 250/231.13; 356/616; 356/617; 359/381; 359/821
(58) Field of Classification Search .......... 250/231.13, 250/231.14, 231.18, 222.1; 356/616, 617, 356/620; 359/381, 384, 811, 819, 821
See application file for complete search history.

(56) References Cited

U.S. PATENT DOCUMENTS

| | | | |
|---|---|---|---|
| 4,961,636 A | 10/1990 | Gaul et al. | |
| 5,260,825 A * | 11/1993 | Nagano et al. | ............. 359/368 |
| 5,396,063 A * | 3/1995 | Ito et al. | ................. 250/231.18 |
| 5,648,869 A | 7/1997 | Ikoh | |
| 5,719,699 A * | 2/1998 | Otomo | ........................ 359/368 |
| 5,737,134 A * | 4/1998 | Watanabe et al. | ............ 359/821 |
| 6,133,561 A * | 10/2000 | Toshimitsu et al. | ...... 250/201.3 |
| 6,154,312 A * | 11/2000 | Takahama et al. | .......... 359/381 |
| 6,323,995 B1 * | 11/2001 | Takahama et al. | .......... 359/371 |
| 6,337,767 B1 * | 1/2002 | Takeuchi | ..................... 359/388 |

FOREIGN PATENT DOCUMENTS

DE 37 11 843 A1 9/1988
JP 2000-266986 A 9/2000

* cited by examiner

*Primary Examiner*—Stephone B. Allen
*Assistant Examiner*—Davienne Monbleau
(74) *Attorney, Agent, or Firm*—Foley & Lardner LLP

(57) ABSTRACT

An apparatus and a method of the present invention positions an optical component among several optical components, which are arranged in a receiving device. The receiving device is rotatable about an axis or movable along a direction in such a way that an optical component is positionable and the receiving device is retainable in a retention position. A coding device having first and second coders and two detectors are also provided. Either the coding device or the two detectors are associated with the receiving device and the two detectors detect the first and second coders at spatially different points. The coding device is embodied in such a way that the two detectors detect the first coder simultaneously when the receiving device is in a retention position and no more than one detector detects the second coder when the receiving device is in a region between two adjacent retention positions.

28 Claims, 6 Drawing Sheets

APPARATUS AND METHOD FOR POSITIONING AN OPTICAL COMPONENT

CROSS REFERENCE TO RELATED APPLICATIONS

This application claims priority of the German patent application 102 45 170.2 which is incorporated by reference herein.

FIELD OF THE INVENTION

The present invention concerns an apparatus and a method for positioning an optical component, several optical components being arranged in a receiving device; the receiving device being rotatable about an axis or movable along a direction in such a way that an optical component is positionable and the receiving device retainable in a retention position corresponding thereto; a coding device having coding means, and two detectors detecting the coding means, being provided; the coding device or the two detectors being associated with the receiving device; and the two detectors detecting coding means at spatially different points.

BACKGROUND OF THE INVENTION

Apparatuses of the species are known in particular from the field of microscopy, where such apparatuses are used as objective turrets or as filter magazines. In the one case the receiving device is a turret, mounted rotatably about an axis, in which various microscope objectives are inserted. In the other case, especially in fluorescence microscopy, the receiving device is embodied as a positionable filter magazine that is likewise rotatable about an axis or movable in a linear direction, optionally in motorized fashion. If the turret is driven in motorized fashion, but also in the case of manual rotation of the turret, it is necessary, for example in order to adjust illumination aperture diaphragms or filters in the optical beam path of the microscope for microscope control purposes, to be able to determine the position in which the turret is currently located, and thus to know which objective is positioned in the beam path of the microscope.

A number of coding and detection means are known from the existing art for this purpose. Reference will be made merely by way of example to DE 37 11 843 A1, from which a turret rotation device for optical components is known. For detection of the current position of the turret rotation device, a total of five sensors or detectors are provided there, detecting different coding means of the coding device provided there. The detectors are arranged in such a way that they each detect the coding device at radially and/or circumferentially different points. The detectors and coding means encompass on the one hand a light barrier that detects a slit, and on the other hand four light barriers that detect light which is reflected from highly reflective strip-shaped coatings that are arranged on the turret rotation device. The coding means or coding device is associated with the receiving device, and the detectors are mounted in stationary fashion on the microscope stand. Detection in this context also encompasses sensing of the instantaneous rotation direction. These coding and detection means entail a high level of component complexity, along with time-consuming manufacturing and functional testing. These coding and detection means are therefore expensive, especially since many components that must be installed and aligned are required.

SUMMARY OF THE INVENTION

It is therefore the object of the present invention to describe and develop an apparatus and a method of the species in such a way as to make possible detection of the position of the receiving device in a context of reduced component complexity for the coding and detection means, and a decreased manufacturing time associated therewith.

The apparatus according to the present invention achieves the aforesaid object. According to an embodiment of the present invention, an apparatus is characterized in that the coding device is embodied in such a way that, on the one hand, the two detectors detect coding means simultaneously when the receiving device is located in a retention position; and, on the other hand, only one of the two detectors detects coding means when the receiving device is located in a region between two adjacent retention positions.

What has been recognized according to the present invention is that detection of the instantaneous position of the receiving device can be accomplished using only two detectors. For that purpose, the coding device is configured in such a way that the two detectors detect coding means simultaneously when the receiving device is located in a retention position. If the receiving device is located in a region between two adjacent retention positions, the coding device is configured, at the points at which the two detectors then detect, in such a way that only one of the two detectors detects coding means. The coding device will be located between two adjacent retention positions when the receiving device is being rotated or moved manually or in motor-driven fashion, for example in order to position a different optical component in the optical beam path of a microscope. With this configuration of the coding device it is thus possible to determine whether the receiving device is located in a retention position or in a region between two adjacent retention positions.

By way of the spatial arrangement or manner of configuration of the coding means of the coding device, a determination can be made as to which of the available retention positions the receiving device is located in. For example, using coding means configured so as to reflect differently, the current retention position of the receiving device could be deduced by the fact that the coding means detected by the first detector has a high reflectivity and the coding means detected by the second detector has a moderate or low reflectivity. It is possible here to provide only one coding means that, specifically, has two regions of differing reflectivity. If the coding means detected by the two detectors then exhibits a specific reflectivity combination in each position corresponding to a retention position, an unequivocal allocation to the currently existing retention position of the receiving device can be made, and the particular one of the optical components that is currently in position is therefore known.

Similarly, the coding means can be arranged in the region of the coding device in which the detectors detect when the receiving device is located between two adjacent retention positions. For example, a different number of coding means, optionally having a different reflectivity, transmissivity, and/or different dimensions, could be arranged in each of these regions, so that by detecting the number and optionally the type of coding means, it is possible to draw conclusions as to the particular region between two adjacent retention positions in which the receiving device is currently located.

According to the present invention, it is thus possible in very particularly advantageous fashion, by way of the spatial arrangement of only two detectors and a corresponding configuration of the coding device, to position one of several optical components and in that context to determine which particular optical component it is. The coding device could, for example, be embodied in the form of a ring or a rail as an integral component that, in particularly advantageous fashion, is easy to install and align. Ultimately, this feature very considerably reduces the component complexity for the coding and detection means, and the manufacturing time required therefor.

In an embodiment, the coding means could be embodied in electronically detectable fashion. This could be accomplished, for example, using detectors that are embodied as microswitches and that are actuated by the coding means of the coding device, which are embodied in the form of lugs or elevations. The detectors could furthermore be constituted by wiper contacts which detect correspondingly arranged coding means of the coding device that are embodied in the form of electrically conductive strips or regions. Electronic detection of the coding means could also be accomplished by means of capacitive or inductive sensors. Corresponding capacitive or inductive components, which are detected by correspondingly embodied detectors, are to be provided in this context as coding means of the coding device.

In an alternative embodiment, the coding means could be detected magnetically. Suitable detectors in this case—as also in the context of the turret rotation device known from DE 37 11 843 A1—would be Hall sensors that detect magnetically embodied coding means. For example, the coding means could encompass permanent magnets that preferably are embodied substantially as strips and are arranged substantially transversely to the motion direction of the receiving device. On the one hand it is thereby possible to arrange many permanent magnets on the coding device. On the other hand, detection of the strip-shaped permanent magnets by the Hall sensors is possible in largely error-free fashion, since they are arranged transversely to the motion direction of the receiving device and move past the detectors with their narrow side as the receiving device moves, so that unequivocally analyzable signals are generated by the detectors. Electronic or magnetic detection of the coding means is advantageous in particular because it does not require a light source (as for example in the context of detection by means of light barriers) which might interfere with microscopic images, for example, as a result of the light of the light source scattered or reflected from the coding means.

In a very particularly preferred embodiment, the coding means are detectable optically. Light barriers that correspondingly detect the coding means are a good choice for this. A "light barrier" is to be understood for purposes of this invention as a light source and one or more detectors which each detect light of the light source that is reflected, refracted, diffracted, or transmitted by the coding device. The simplest approach, however, is to provide a reflective light barrier or a light barrier which detects coding means that are moved between the light source and the detector. Since two detectors are provided according to the present invention, a good choice is to use a fork light barrier or a double-reflection light barrier. These types of light barrier each encompass a light source and two detectors that detect light of the light source, and are available commercially as a preconfigured individual assembly.

In the context of optical detection of the coding means, it is a good choice to embody the coding means as slits, struts, or reflective regions. If the coding means are embodied as slits or notches, they are appropriately detected using a fork light barrier. The coding means could also be embodied in the form of struts which, for example, extend like the rungs of a ladder over a corresponding interstice of the coding device. The coding device could thus, for example, be embodied as an annular disk that is associated with the receiving device and that has slits. The part of the fork light barrier that encompasses the light source would need to be arranged on one side of the annular disk, and the part of the fork light barrier that encompasses the two detectors on the other side of the annular disk. The region of the annular disk that has the slits could be arranged in radially projecting fashion with respect to the receiving device if the receiving device is embodied, for example, as an objective turret. The fork light barrier can then be positioned, as an integral assembly, at a point such that it fits radially around the projecting region of the coding device.

It is additionally conceivable to embody the coding means as reflective regions. Detection by means of a double-reflection light barrier would be appropriate in this case. Here the coding device which comprises the reflective regions would not need to be arranged in radially projecting fashion on the receiving device, advantageously making possible a compact design for the receiving device. The coding means, embodied as slits or reflective regions, are preferably arranged substantially transversely to the motion direction of the receiving device. They are thus, in particular, narrow slits or regions of elongated configuration, which if necessary can be arranged at a close spacing from one another; and a correspondingly large number of coding means can be detected in the context of a motion, thereby advantageously allowing high accuracy in detecting the position of the receiving device.

In a very particularly preferred embodiment, the light source of the light barrier is switched off when the receiving device is located in a retention position. As a result, for example in the context of a fluorescence microscope, any disruptive superimposition of scattered light from the light source of the light barrier, scattered at the coding device or the coding means, can advantageously be avoided. In fluorescence microscopy, the wavelength region of the fluorescent light that is to be detected at least partially coincides with the wavelength range of the light source of the light barrier, so that that scattered light, if it enters the detection beam path of the fluorescence microscope, would be detected as fluorescent light. Since the position of the receiving device in a retention position need not be continuously detected, switching off the light source of the light barrier is not disadvantageous, and usually it is switched on only briefly when a position check is necessary.

Concretely, a retaining device that is arranged in stationary fashion and retains the receiving device in a retention position is provided. Retention of the receiving device is preferably accomplished on a mechanical basis. This is because the receiving device can then be moved or rotated manually or in motor-driven fashion, so that retention of the receiving device need not necessarily be accomplished by way of a holding torque of a motor. In some circumstances, retention using a motor may not position the receiving device accurately enough, and certainly not if the motor control system is of relatively simple configuration.

In a microscope, the retaining device of the receiving device, embodied as an objective turret, is usually arranged in stationary fashion directly or indirectly on the microscope stand. The retaining device encompasses a roller or ball, mounted with force impingement, that as a result of the force impingement presses into a locking notch provided on the receiving device when the receiving device is located in a retention position and the roller or ball can thus engage into the locking notch. The force impingement on the roller or ball can be accomplished, for example, using a spring. The locking notch preferably has one or two capture ramps that define a so-called "capture region" of the retaining device. This capture ramp could concretely be embodied as a surface that is arranged at an obtuse angle to the rest of the surface of the receiving device on which the roller or ball rolls in the non-retained state. If the locking notch has two capture ramps, they are arranged on either side of the central position of the locking notch, so that the roller or ball can be captured from both motion directions of the receiving device. The locking notch furthermore encompasses with its center region two surfaces which are arranged in such a way that in the locked-in state, the roller or ball has either linear or point contact with the two surfaces. Precise and reproducible retention of the receiving device on a mechanical basis is thereby achieved.

In principle, the two detectors can detect the coding means of the coding device at completely different points, for example at two opposite points in the case of a coding device embodied annularly. In this case, however, assuming optical detection of the coding means, two light sources and two detectors need to be provided. In a particularly preferred embodiment, therefore, the two detectors are arranged with respect to one another in such a way that they detect the coding means at an effective distance D, distance D being of the order of magnitude as the dimensions of the coding means. It is thus advantageously possible, for example in the context of optical detection of the coding means, to use a fork light barrier that is commercially available as an integral assembly and encompasses only one light source.

As already discussed above, it is possible according to the present invention to detect with the two detectors in such a way that the receiving device is located in a retention position when the two detectors are simultaneously detecting coding means. In a very particularly preferred embodiment, the coding device is embodied for that purpose in such a way that in each retention position of the receiving device there is provided, at the points of the coding device detected by the detectors, a coding means which has an effective width B that is greater than or equal to the effective distance D of the detectors. The "effective width B" means, in particular, the dimension of the coding means that is measured along the motion direction in the context of a motion of the coding device relative to the detector. Especially when the two detectors are arranged with respect to one another at a distance that is of the same order of magnitude as the coding means, the corresponding coding means needs simply to be configured in such a way that the condition $B \geq D$ is met. If the two detectors are arranged at a short distance D from one another, the effective width B of coding means can then be selected to be a little bit larger; this is favorable in terms of a space-saving configuration of the coding device, since many coding means can be arranged in a small space.

The situation discussed below is one in which the retaining device has a so-called "capture region" which ensures that the receiving device is positioned and retained, substantially as a result of the retaining device, when the receiving device approaches sufficiently close to the retention position that it comes into the capture region of the retaining device. The coding device could, for example, be embodied in such a way that there is provided in each retention position of the receiving device, at the points of the coding device detected by the detectors, a coding means which has an effective width B that is less than or equal to width E of the capture region of the retaining device. The two detectors thus detect the corresponding coding means when the receiving device is located in the capture region of a retention position but has not yet finally assumed that position. This is not disadvantageous, however, since, in this case, the retaining device itself performs the remaining fine positioning of the receiving device as a result of its particular configuration. A corresponding evaluation of the detected signals of the two detectors can, however, take into account this locking behavior of the receiving device.

In a very particularly preferred embodiment, the coding device is embodied, in particular for detection of the path length traveled by the receiving device in the context of a rotation or motion, in such a way that in the region of the coding device in which the detectors detect when the receiving device is located between two adjacent retention positions, at least two coding means are provided that are each at a distance T from one another which preferably is substantially constant. The region of the coding device in which the detectors detect when the receiving device is located between two adjacent retention positions corresponds to the region of the coding device that lies between the two coding means that are arranged at the points of the coding device detected by the detectors when the receiving device is located in each of the two adjacent retention positions. For simplicity's sake, this region of the coding device will be referred to hereinafter as the "intermediate region" of the coding device. Since the two detectors detect the coding means of the coding device at different points, the rotation direction or motion direction of the receiving device can be determined by way of the sequence in time of the detected signals of the detectors. This is advantageous in particular if no motor control system to move or rotate the receiving device, which system defines the rotation direction by way of a corresponding control action so that it is already known, is present.

Concretely, a receiving device that, for example, receives five optical components and thus has five different retention positions, could have in an intermediate region of the coding device five coding means that are each at a constant distance T1 from one another. During the rotation or motion of the receiving device from the one retention position to the adjacent one, the two detectors then respectively detect the five coding means, i.e. each detector detects the five coding means of that intermediate region of the coding device. If, in an adjacent intermediate region of the coding device, e.g. six coding means are then provided, each at a constant distance T2, the two detectors respectively detect six coding means when the receiving device moves from one retention position to the corresponding other one. In this example, the distance T1 in the region in which five coding means are provided is different than in the region in which six coding means are provided; i.e. the distances between them in the one intermediate region are each $T1=\frac{1}{6}* L1$, and in the other intermediate region are each $T2=\frac{1}{7}* L2$. L1 here is the length of the intermediate region having five coding means and L2 corresponds to the length of the intermediate region having six coding means. If five coding means, each at a constant distance from one another, are provided in the region having a length L1, this corresponds to six interstices of equal length each having a length T1. The current position of the receiving device can thus be deduced by evaluating the number of coding means detected in the respective intermediate regions of the coding device; it is thereby possible to check the motion of the receiving device, or the detected signals generated by the detectors can be used to regulate the motion of the receiving device. The nature, number, and/or sequence of the coding means of the coding device in their position relative to the receiving device are, of course, known to any control device that may be provided.

The coding device could also be embodied in such a way that, in the region of the coding device in which the detectors detect when the receiving device is located between two adjacent retention positions, the coding device has a region without coding means, the effective width L of that region corresponding to at least 1.1 times the distance T between two adjacent coding means, i.e. $L \geq 1.1 * T$. In this case the number of coding means in each intermediate region of the coding device is identical, for example nine. The distance between two adjacent coding means(except for the region without coding means) is also substantially constant, i.e. has a value T. The region without coding means has a width L greater than the distance T between two adjacent coding means, in particular because it is thereby easily detectable. For example, nine coding means can be provided in each intermediate region of the coding device, but they are arranged at a constant distance T corresponding to the distance if eleven coding means were arranged in the intermediate region of the coding device, without a gap and at a constant distance from one another.

If the region without coding means is then arranged at a different point in each of the various regions of the coding device in which the detectors detect when the receiving device is located between two adjacent retention positions, detection of the sequence of coding means and of the region without coding means of a respective intermediate region of the coding device allows conclusions as to the current position of the receiving device. Here again, an evaluation of the detected signals generated by the two detectors can be used to monitor the current position of the receiving device and/or to regulate the motion of the receiving device. By detecting the coding means and evaluating them, for example by counting corresponding pulses, it is possible in particular to determine whether the previous and, if applicable, the next retention position was selected correctly. A prerequisite for this, however, would be a substantially constant rotation or motion velocity of the receiving device, if all that occurs is a time sequence of the detected signals.

Automation of a total system can be accomplished by way of a motor device that rotates or moves the receiving device. The motor device preferably encompasses a unit that controls a motor in open- or closed-loop fashion. With this it is possible, for example, to take into account an asymmetrical loading of the receiving device when controlling or regulating the motor, if the receiving device is an objective turret of a microscope and is installed in an oblique position. With the oblique installation position, the asymmetrical loading necessitates adapted regulation of the motor at each rotational position of the objective turret, specifically so that a differing torque necessary for rotation can be made available. A direct current electric motor could, in particular, be provided as the motor. If the objective turret has a horizontal installation position despite being asymmetrically loaded, motor regulation is not absolutely necessary and speed control for the direct current electric motor can be implemented by the application of different voltages.

The receiving device is coupled to the motor via a drive train device and/or a transfer device serving to transfer the rotational motion of the motor to the receiving device. The drive train device can, concretely, be embodied in such a way that the overall conversion ratio is selected so that a roller or ball of a retaining device, mounted with force impingement, can rotate the motor against its holding torque in the process of locking into a locking notch. A toothed belt or a gear is preferably provided as the transfer device between the motor and the receiving device or between the motor with drive train device and the receiving device. By suitable selection of the motor and the overall conversion ratio it is possible, for example, to achieve a positioning time for a fluorescent filter turret having eight different filter blocks of well under 0.6 second if the shortest path to the target position is selected in each case, and well under one second if rotation occurs over the rotation angle of seven positions (315°); in particularly advantageous fashion, this can very considerably reduce the total acquisition time for an automatic image series (e.g. in pathology) using different fluorescences.

For automation of a total system, a control device is provided which processes the detected signals of the two detectors and controls the motor device. This control device could be implemented, for example, in the form of a microcontroller that has, in particular, an EPROM or an EEPROM. Provision is made, in particular, for the necessary detections and calculations to be controlled and performed by the control device in real time. The output signals of the two detectors are preferably digitally processable. This can be accomplished, for example, using an electronic circuit that logically processes the signals of the detectors of a fork light barrier in such a way that the electronic circuit conveys a signal in digital form to the control device. The electronic circuit could be arranged directly at the fork light barrier, so that the electronic circuit delivers only digital signals to the control device, for example via an existing bus system.

Very generally, the invention presented here could serve to position a unit of any kind, which therefore need not necessarily be suitable for receiving optical components. A concrete application of the invention presented here can be achieved, for example, by way of a receiving device that is embodied as a turret for the reception of microscope objectives. A further application could consist, for example, in embodying the receiving device in the form of a magazine for the reception of filter sets which is used e.g. in a fluorescence microscope and is to be positioned accordingly. The optical components are preferably arranged in aligned fashion in the receiving device; this is consistently the case in microscopy, and is ensured by way of objective threads of appropriate manufacturing accuracy on the turret.

In terms of method, the object cited above is achieved by a method wherein the coding device is embodied in such a way that, on the one hand, the two detectors detect coding means simultaneously when the receiving device is located in a retention position; and, on the other hand, only one of the two detectors detects coding means when the receiving device is located in a region between two adjacent retention positions.

The method according to the present invention is suitable in particular for operation of the apparatus of the present invention, and the reader is therefore referred to the preceding portion of the specification in order to avoid repetition.

In order to initialize the apparatus for positioning an optical components, a rotation or motion of the receiving device through at least one retention position is accomplished, the detected signals of the two detectors being detected and evaluated. It is thereby possible to determine, for example, the position in which the receiving device of a microscope, embodied as an objective turret, is located shortly after a switching-on operation, given that the objective turret could have been displaced manually while the microscope was switched off.

With the apparatus and the method according to the present invention, the component complexity of the coding and detection means can thus be reduced in very particularly advantageous fashion, ultimately making possible simpler assembly and functional checking. The coding device can be embodied in the form of an easily manufactured incrementer ring that can be installed on the receiving device with little alignment effort. The receiving device can be rotated or moved at high speed, and controlled and timely deceleration is likewise possible. It is always possible to monitor whether the receiving device is located in a retention position, and incorrect positioning of the receiving device during rotation or motion of the receiving device is reliably recognized. A correction of the positioning of the receiving device is thus also immediately possible if, for any reason, a malfunction occurs during positioning and prevents correct locking of the receiving device. Possible malfunctions could be electrical or mechanical faults, for example if positioning was not correctly completed within a certain time. The motor voltage can then be switched off via a software timeout, and an error message generated.

BRIEF DESCRIPTION OF THE DRAWINGS

There are various ways of advantageously embodying and developing the teaching of the present invention. The reader is referred for that purpose, on the one hand, to the claims, and, on the other hand to the explanation below of the preferred exemplary embodiments of the invention with reference to the drawings. In conjunction with the explanation of the preferred exemplary embodiments of the invention with reference to the drawings, an explanation is also given of generally preferred embodiments and developments of the teaching. In the drawings:

DETAILED DESCRIPTION OF THE INVENTION

Figure 1:
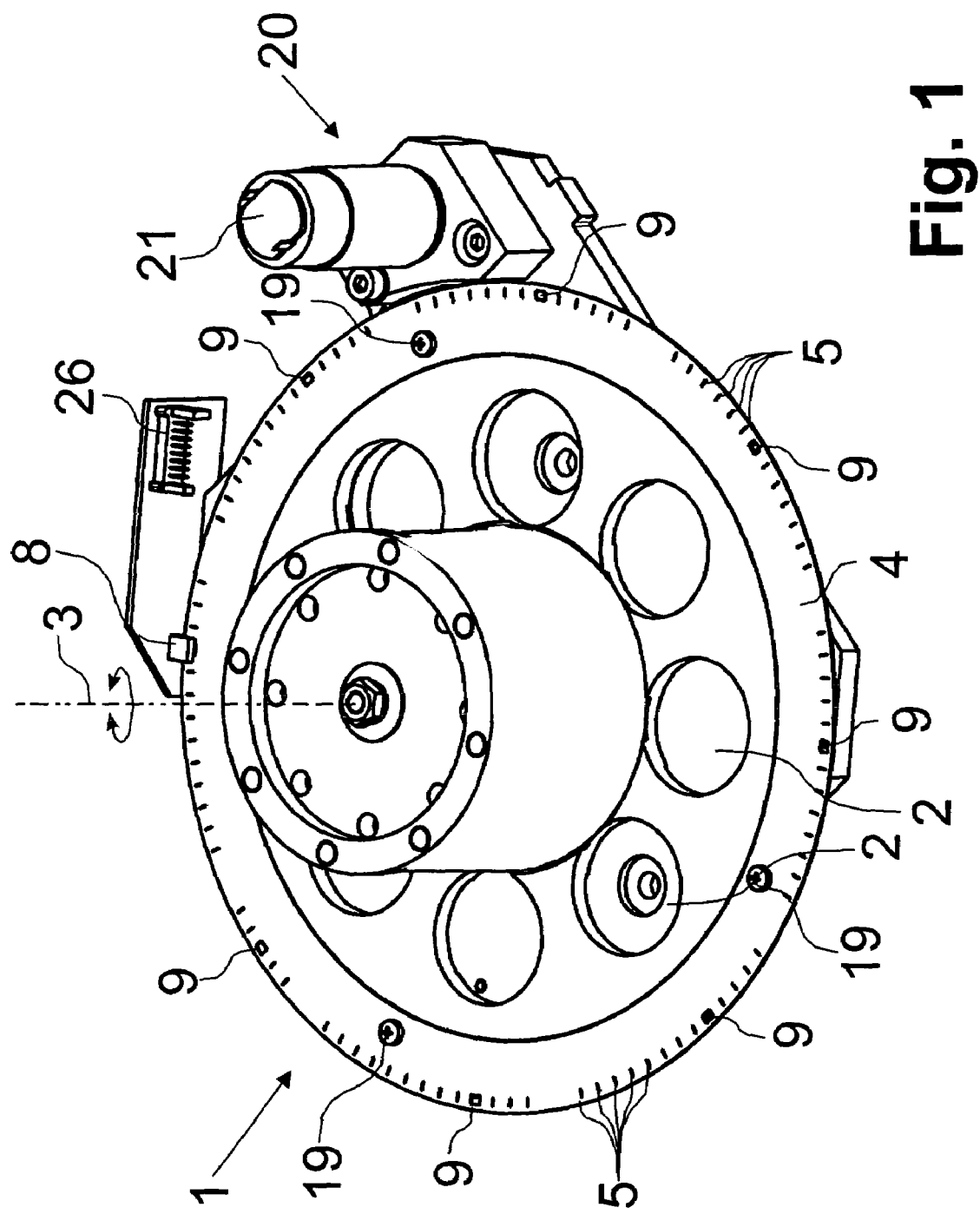
FIG. 1 is a schematically depicted perspective view of a first exemplary embodiment of the present invention.
Figure 2:
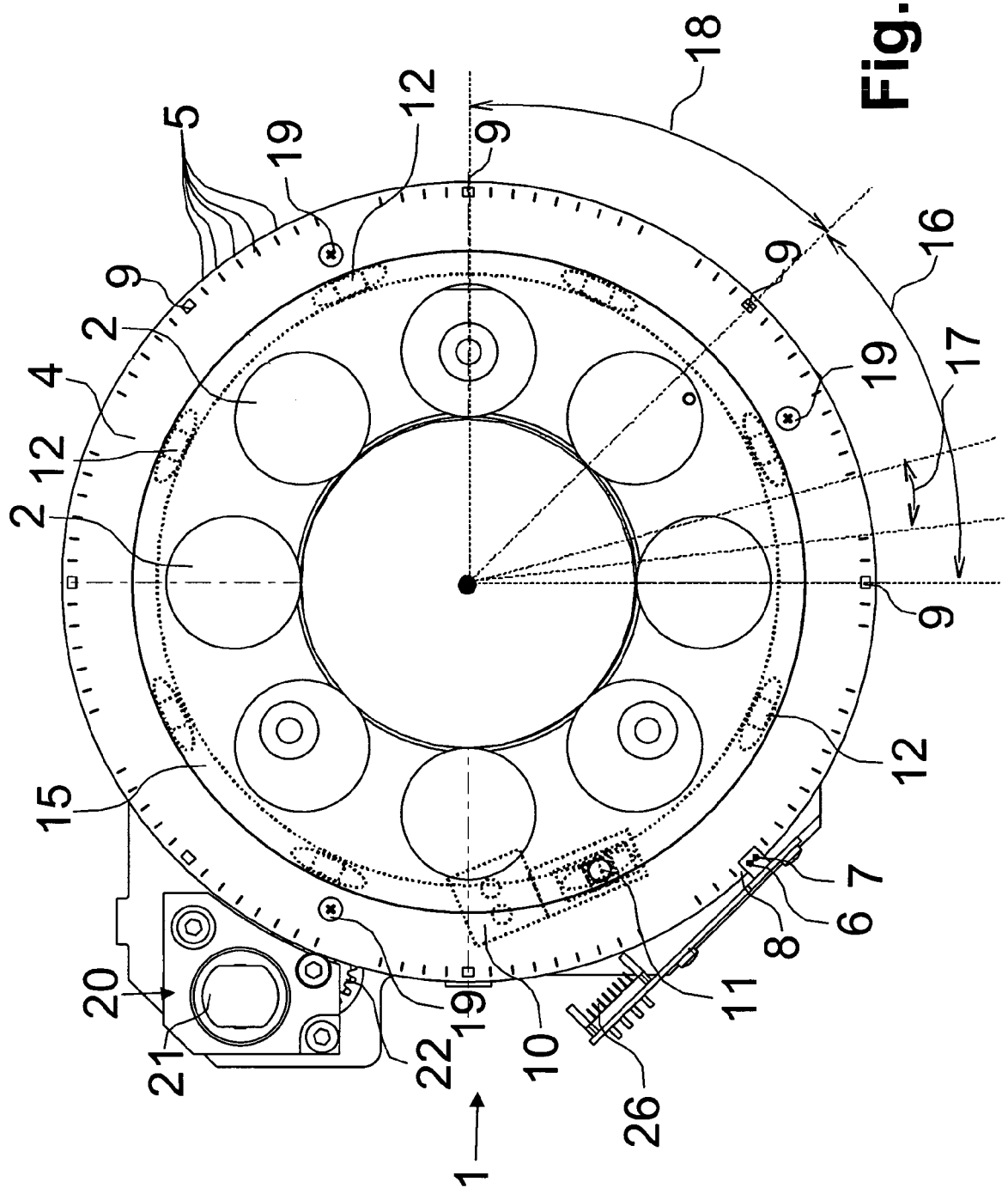
FIG. 2 is a schematically depicted plan view of the exemplary embodiment from FIG. 1.

FIGS. 1 and 2 show an apparatus for positioning optical components, in which context several optical components can be arranged in a receiving device 1 embodied as a fluorescence filter turret. The optical components in this case are fluorescence filters that are arranged respectively on the total of eight beam openings 2. The optical components are not shown in FIGS. 1 and 2. Receiving device 1 is arranged rotatably about axis 3, specifically in two opposite rotation directions as indicated by the double arrow shown in FIG. 1. Using receiving device 1, one optical component at a time can be positioned in the beam path of a microscope (not shown), receiving device 1 being retainable for that purpose in a corresponding retention position.

It is evident from FIGS. 1 and 2 that receiving device 1 has associated with it a coding device 4 that comprises coding means 5 and 9. Coding device 4 is embodied in the form of an annular disk that is immobilized and simultaneously aligned with the three screws 19 shown in FIGS. 1 and 2. Coding means 5 and 9 of coding device 4 are detected using two detectors 6 and 7 that are arranged in fork light barrier 8 that is shown schematically in FIG. 2. The two detectors 6 and 7 detect coding means 5 at spatially different points of coding device 4.

According to the present invention, coding device 4 is embodied in such a way that on the one hand the two detectors 6 and 7 detect a coding means 9 simultaneously when receiving device 1 is located in a retention position. On the other hand, coding device 4 is embodied in such a way that only one of the two detectors 6 and 7 detects coding means 5 when receiving device 1 is located in a region between two adjacent retention positions.

Coding means 5 and 9 are detected optically using a fork light barrier 8, coding means 5 and 9 each being embodied in the form of slits in the annular disk. Slits 5 have a width of approx. 0.15 mm, while slits 9 have a width of approx. 2.5 mm. Slits 5 and 9 are arranged transversely to the motion direction of receiving device 1, i.e. the long side edges of slits 5, and two of the side edges of slits 9, extend radially with respect to axis 3 of receiving device 1.

FIG. 2 shows that a retaining device 10, which is arranged in stationary fashion and retains receiving device 1 in a retention position, is provided. Retaining device 10 is mounted in stationary fashion on the portion of receiving device 1 that is not rotated, and is thus arranged indirectly on the microscope stand. Retaining device 10 retains receiving device 1 on a mechanical basis, specifically by the fact that a ball 11, mounted with force impingement, presses into one of the eight locking notches 12 provided on receiving device 1. Ball 11 that is mounted with force impingement is arranged in retaining device 10 in such a way that the force acts in a direction that, in the plan view depicted in FIG. 2, is directed upward out of the plane of the drawing. The retained state of receiving device 1 shown in FIG. 2 is shown in the upper part of FIG. 4 in a schematic side view. Locking notch 12 encompasses two capture ramps 13, embodied in the form of beveled surfaces, that are arranged at an oblique angle 14 to surface 15 of receiving device 1 on which roller 11 rolls in the non-retained state. In FIG. 2, the region of surface 15 on which roller 11 rolls in the non-retained state is indicated with dashed lines. If receiving device 1 then approaches a retention position, roller 11 mounted with force impingement will at first roll along a capture ramp 13 until it is arranged centeredly with respect to locking notch 12, and receiving device 1 is thus retained in the corresponding retention position. Roller 11 is impinged upon with the force of a spring (not shown), the spring constant of that spring being dimensioned such that receiving device is rotated into the retention position as a result of the spring force.

Figure 3:
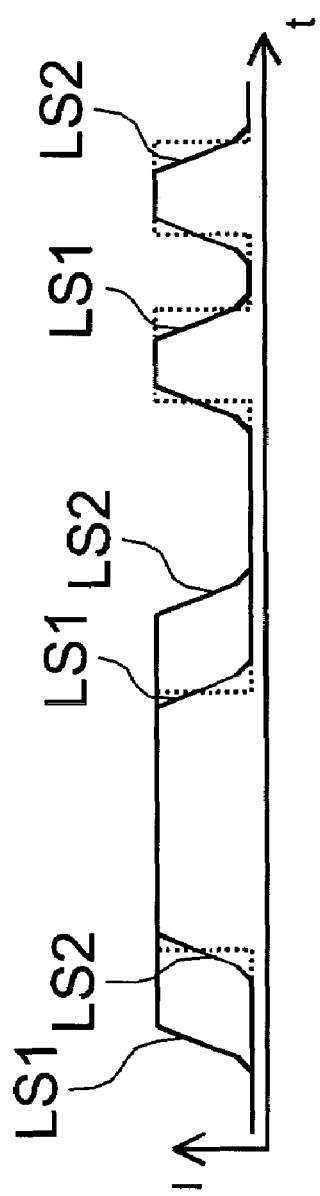
FIG. 3 is a schematically depicted diagram of the analog detected signals of the two detectors, the relative motion between the coding device and the two detectors being indicated.
Figure 3:
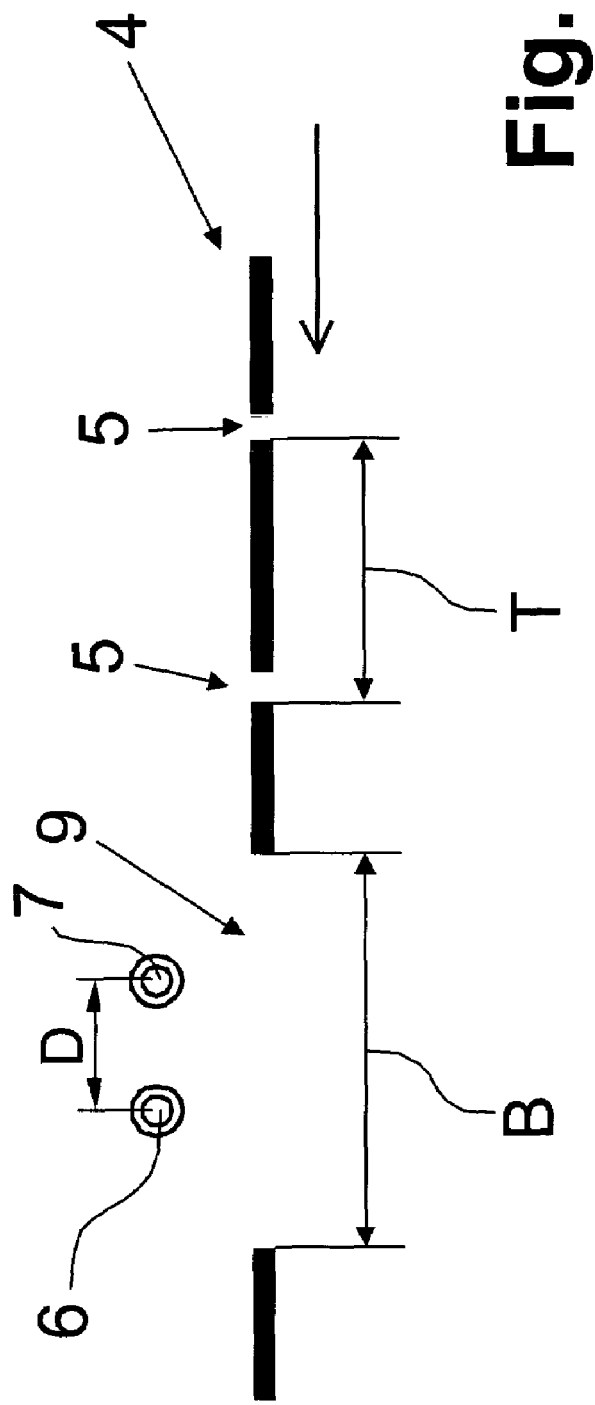

FIG. 3 shows that the two detectors 6 and 7 are arranged at a distance D from one another, so that coding means 5 and 9 in that effective distance D are detected by the two detectors 6 and 7. The distance D between the two detectors 6 and 7 is approx. 0.8 mm. Distance D is thus on the same order as the slit width of coding means 5 and 9.

Figure 6:
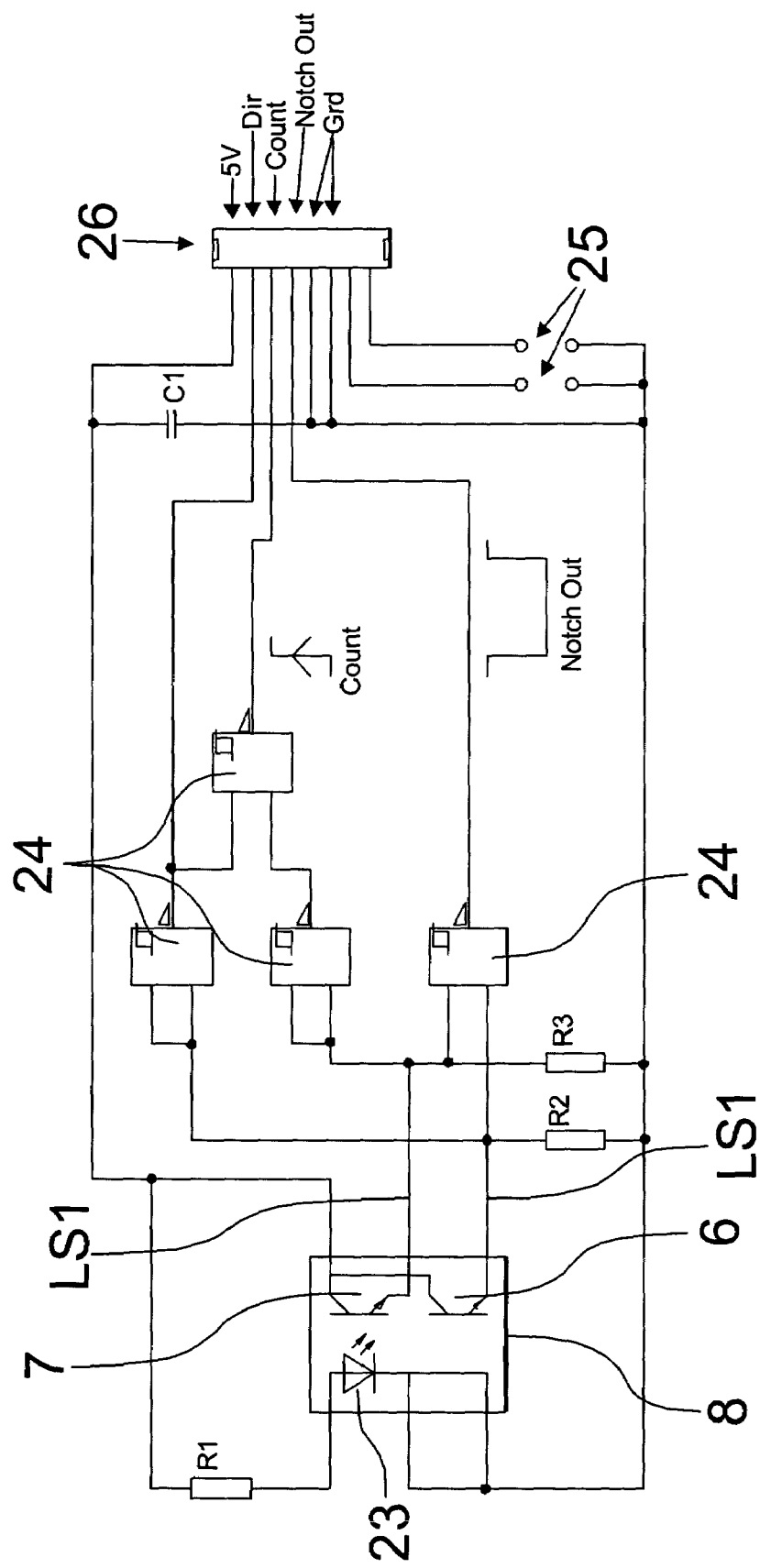
FIG. 6 schematically depicts a circuit for evaluating the analog detected signals of the two detectors.

FIG. 3 shows the intensity of the analog output signals LS1 and LS2 of the two detectors 6 and 7 as a function of time, coding device 4 shown partially in the lower part of FIG. 3 being moved, together with receiving device 1, from right to left (as indicated by the arrow below). In the upper diagram of FIG. 3, the digital signals generated by the electronic circuit shown in FIG. 6 are depicted with dashed lines.

It is clearly evident from FIGS. 1 and 2 that coding device 4 is embodied in such a way that in each retention position of receiving device 1, one coding means 9 is provided at each of the points of coding device 4 detected by detectors 6 and 7. Coding means 9 have an effective width B which is greater than effective distance D of the two detectors 6 and 7. At the same time, effective width B of coding means 9 is smaller than width E of the capture region constituted by the width of locking notch 12 together with the two capture ramps 13.

Figure 5:
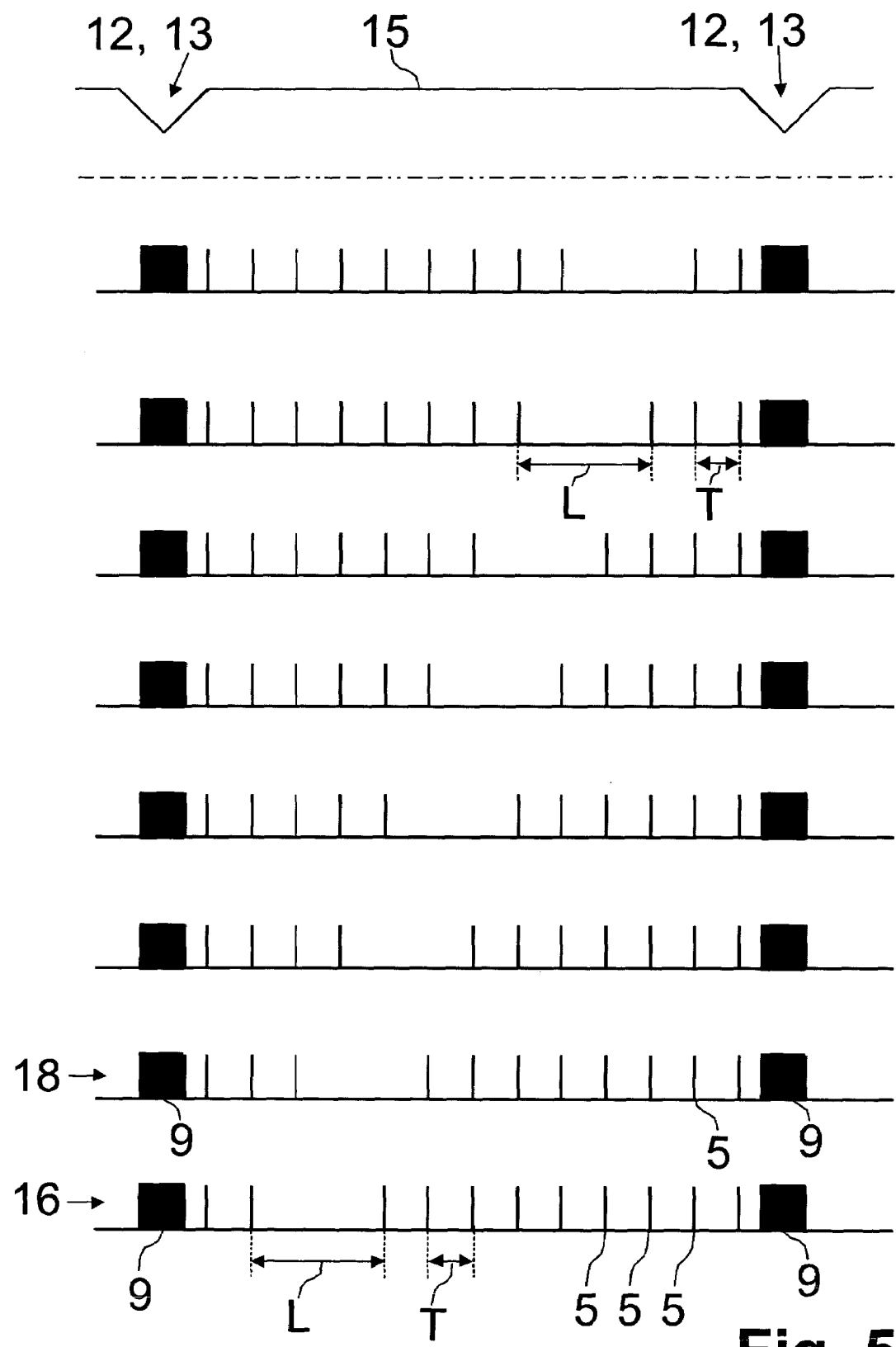
FIG. 5 schematically depicts the arrangement of the coding means in eight different intermediate regions of the coding device that is also shown in FIGS. 1 and 2.

Coding device 4 is embodied in such a way that when receiving device 1 is located between two adjacent retention positions, eleven coding means 5 are provided in the region of coding device 4 in which the two detectors 6 and 7 detect. One of these regions is labeled with the reference character 16 in FIG. 2, and will be referred to hereinafter as an intermediate region of coding device 4. Except for a region 17 in which no coding means 5 are provided, coding means 5 are arranged in region 17 each at a constant distance T from one another. Effective width L of the region without coding means 5 corresponds to three times distance T. The sequence of coding means 9 and 5 of region 16 is shown schematically in the bottom diagram of FIG. 5, based on the circumferential arrangement of coding means 9 and 5. The diagram above that in FIG. 5 shows the sequence of coding means 9 and 5 of region 18 that is adjacent to region 16, coding means 9 of region 16 shown at the right being identical to coding means 9 of region 18 shown at the left. The schematic diagrams thereabove show the respective sequences of the other intermediate regions of coding region 4, as shown collectively in FIGS. 1 and 2. The uppermost schematic depiction in FIG. 5 shows on the one hand (in simplified fashion) locking notch 12 together with capture ramps 13, as well as surface 15 of receiving device 1 on which roller 11 of retaining device 10 rolls; it is evident here with very particular clarity that coding device 4 is arranged with respect to receiving device 1 in such a way that one locking notch 12 is provided at the location of each coding means 9.

It is apparent both from FIGS. 1 and 2 and from FIG. 5 that the region without coding means 5—i.e., for example, region 17 of region 16—is arranged at a different point in each respective intermediate region of coding device 4. Ultimately, the eleven coding means 5 are arranged in each intermediate region of coding device 4 as if there were thirteen coding means 5 arranged at the same distance T from one another, but two of them had been respectively omitted at a different point in each intermediate region of coding device.

A motor device 20 that rotates receiving device 1 is provided in the exemplary embodiment of FIGS. 1 and 2. Motor device 20 has a motor 21 that is mounted in stationary fashion on the portion of receiving device 1 which does not rotate. Motor 21 is a direct current electric motor. It is evident in indicative fashion from FIG. 2 that a transfer device embodied in the form of a gear 22, which transfers the rotational motion of motor 21 to the rotating portion of receiving device 1, is provided.

Figure 4:
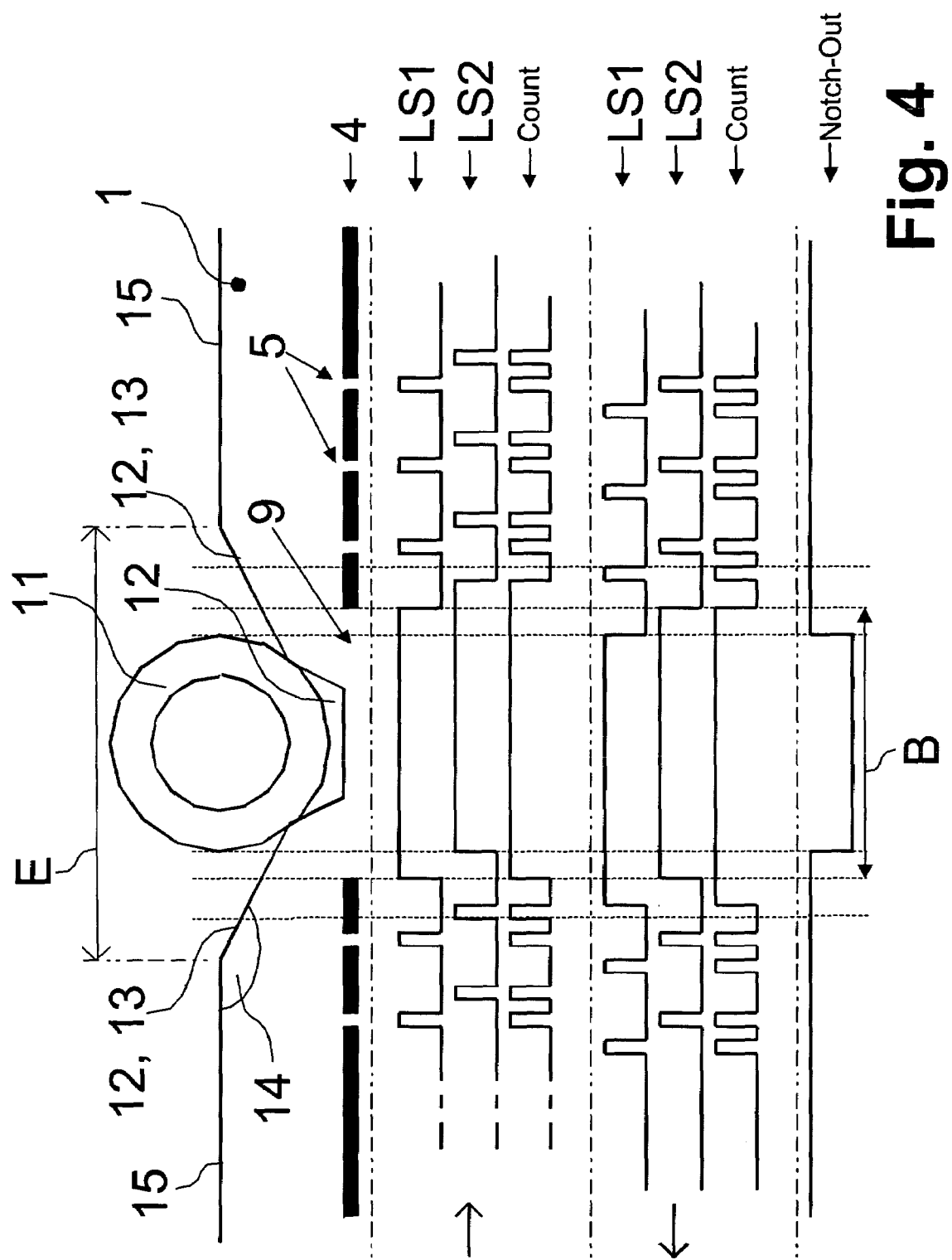
FIG. 4 is a schematic depiction in the form of diagram segments showing the digital detected signals of the two detectors for different rotation directions of the receiving device, a portion of the coding device and a portion of the retaining device being shown.

FIG. 6 shows a circuit diagram of the electronic circuit that on the one hand controls fork light barrier 8 and that reads out the detected signals generated by the two detectors 7 and 8, evaluates them, and outputs them in digital form. Fork light barrier 8 of FIG. 6 is a commercially available TCUT1200 component having a light source 23. The four components 24 are type 74HCT132 CMOS ICs. Reference character 25 identifies two solder bridges with which the turret configuration, e.g. with four, five, or eight clickstops, can be coded. This coding is not absolutely necessary, however, since the turret configuration can be deduced by counting the number of coding means 5 between coding means 9. The electronic circuit of FIG. 6 supplies at its 8-pin output interface 26, inter alia, digital output signals whose profiles as a function of the rotational motion of receiving device 1 are shown in FIG. 4. The Count output delivers the pulses generated by means of an OR operation, which are generated when only one of the two detectors 6 and 7 detects a coding means 5, i.e. when receiving device 1 is located in a region between two adjacent retention positions. The Notch Out output delivers the pulses generated by a NAND operation, which are generated when two detectors 6 and 7 simultaneously detect a coding means 9, i.e. when receiving device 1 is located in a retention position.

FIG. 4 shows, schematically and in diagrammatic form, digital signals LS1, LS2 and Count of the electronic circuit of FIG. 6, in each case in the context of a motion of the portion of coding device 4 shown in the upper part of FIG. 4 on the one hand from left to right and on the other hand from right to left, as indicated respectively by the arrows at the left side of FIG. 4. The schematic diagram at the bottom of FIG. 4 furthermore shows the Notch Out signal of the electronic circuit of FIG. 6.

In conclusion, be it noted very particularly that the exemplary embodiments discussed above serve merely to describe the teaching claimed, but do not limit it to the exemplary embodiments.

PARTS LIST

1 Receiving device
2 Beam opening
3 Rotation axis of (1)
4 Coding device
5 Coding means
6 First detector
7 Second detector
8 Fork light barrier
9 Coding means detected by (6) and (7) when (1) is located in a retention position
10 Retaining device
11 Ball of (10)
12 Locking notch of (10)
13 Capture ramp of (12)
14 Obtuse angle between (13) and (15)
15 Surface of (1) on which (11) rolls in non-retained state
16 Region of (4) in which (6) and (7) detect when (1) is located between two adjacent retention positions
17 Region in (16) in which no coding means (5) are provided
18 Region of (4) adjacent to (16)
19 Screws for immobilizing and aligning (4) on (1)
20 Motor device
21 Motor of (20)
22 Gear
23 Light source of (8)
24 74HCT132
25 Solder bridge
26 Output interface of electronic circuit from FIG. 6
D Distance between (6) and (7)
B Width of coding means (9)
E Width of capture region constituted by (12) together with (13)
T Distance between two adjacent coding means (5)
L Region of (4) in which no coding means (5) are arranged

What is claimed is:

1. An apparatus for positioning an optical component, arranged in a receiving device together with several optical components, said apparatus comprising:
   said receiving device being rotatable about an axis or movable along a direction and being retainable in several retention positions;
   said optical component being positionable in a corresponding retention position;
   a coding device having at least one first coding means with a first width and at least one second coding means with a second width, and
   two detectors for detecting the first and second coding means;
   wherein said coding device or the two detectors are associated with said receiving device;
   wherein the two detectors detect the first and second coding means at spatially different points, and
   wherein said coding device is embodied in such a way that the two detectors detect the first coding means simultaneously when the receiving device is located in a retention position, and no more than one of the two detectors detects the second coding means when the receiving device is located in a region between two adjacent retention positions.

2. The apparatus as defined in claim 1, wherein the coding means are detectable electronically by microswitches, wiper contacts, or capacitative or inductive sensors.

3. The apparatus as defined in claim 1, wherein the first and second coding means are detectable magnetically by Hall sensors.

4. The apparatus as defined in claim 1, wherein the first and second coding means encompass permanent magnets that are embodied substantially as strips and are arranged substantially transversely to the motion direction of the receiving device.

5. The apparatus as defined in claim 1, wherein the first and second coding means are detectable optically by a light barrier.

6. The apparatus as defined in claim 1, wherein the first and second coding means encompass slits, struts, or reflective regions that are arranged substantially transversely to the motion direction of the receiving device.

7. The apparatus as defined in claim 5, wherein a light source of the light barrier is switched off when the receiving device is located in a retention position.

8. The apparatus as defined in claim 1, wherein a retaining device is provided that-is arranged in a stationary fashion and retains the receiving device in a retention position on a mechanical basis.

9. The apparatus as defined in claim 8, wherein the retaining device encompasses a roller or ball mounted with force impingement;
   wherein, as a result of the force impingement, the roller or ball presses into a locking notch provided on the receiving device, and
   wherein the locking notch encompasses a capture ramp.

10. The apparatus as defined in claim 1, wherein the two detectors are arranged with respect to one another in such a way that they detect the first and second coding means at an effective distance D, and
   wherein the distance D is the same order of magnitude as the dimensions of the first and second coding means.

11. The apparatus as defined in claim 10, wherein the coding device is embodied in such a way that, in each retention position of the receiving device, there is provided, at the points where the coding device is detected by the detectors, the first coding means which has an effective width B that is greater than or equal to the effective distance D of the detectors.

12. The apparatus as defined in claim 10, wherein the coding device is embodied in such a way that there is provided, in each retention position of the receiving device, at the points of the coding device detected by the detectors, the first coding means which has an effective width B that is less than or equal to the width E of a capture region of a retaining device.

13. The apparatus as defined in claim 1, wherein the coding device is embodied in such a way that, in the region of the coding device in which the detectors detect, when the receiving device is located at a position between two adjacent retention positions, at least two second coding means are provided that are each at a distance T from one another which is substantially constant.

14. The apparatus as defined in claim 13, wherein the coding device is embodied in such a way that, in the region of the coding device in which the detectors detect, when the receiving device is located between two adjacent retention positions, the coding device has a region without coding means, and
   wherein the effective width L of the region without coding means corresponds to at least 1.1 times the distance T between two adjacent second coding means.

15. The apparatus as defined in claim 14, wherein the region without coding means is arranged at a different point in each of the various regions of the coding device in which the detectors detect when the receiving device is located between two adjacent retention positions.

16. The apparatus as defined in claim 1, wherein a motor device is provided that rotates or moves the receiving device.

17. The apparatus as defined in claim 16, wherein the receiving device is coupled to the motor via a drive train device and/or a transfer device serving to transfer the rotational motion of the motor to the receiving device.

18. The apparatus as defined in claim 16, wherein a control device is provided which processes the detected signals of the two detectors and controls the motor device, and
   wherein output signals of the two detectors are digitally processable.

19. The apparatus as defined in claim 1, wherein the receiving device encompasses a turret for the reception of microscope objectives or a magazine for the reception of filter sets, and
   wherein the optical components are arranged in an aligned fashion in the receiving device.

20. A method for positioning an optical component, said optical component being arranged in a receiving device together with several optical components, comprising the steps:
   moving said receiving device by rotating about an axis or by moving along a direction thereby being retainable in several retention positions;
   positioning said optical component in a corresponding retention position by moving said receiving device;
   detecting at least one of a first coding means having a first width and a second coding means having a second width; wherein said first and second coding means are associated with said receiving device;
   wherein during moving said receiving device, for detecting a position of said receiving device, said first and second coding means are detectable at two spatially different points of the receiving device, by said detection, deriving two detecting signals simultaneously when the receiving device is located in a retention position, and by said detection, deriving no more than one detecting signal when the receiving device is located in a region between two adjacent retention positions.

21. The method as defined in claim 20, wherein an initialization of an apparatus for positioning the optical component is accomplished by rotation or motion of the receiving device through at least one retention position, wherein the first and second coding means are detectable by two detectors, and wherein the output signals of the two detectors are detected and evaluated.

22. The method as defined in claim 20, wherein by detection of a sequence of coding means and a region without coding means, a position signal is derived which indicates the actual position of said receiving device.

23. The method as defined in claim 22, wherein movement or positioning of said receiving device is controlled or adjusted by said position signal.

24. An apparatus for positioning an optical component, said apparatus comprising:

a receiving device being rotatable about an axis or movable along a direction and being retainable in several retention positions, an optical component being positionable in a corresponding retention position, a coding device having at least one first coder with a first width and at least one second coder with a second width, and two detectors for detecting the first and second coders;

wherein said coding device or the two detectors are associated with said receiving device;

wherein the two detectors detect the first and second coders at spatially different points, and wherein said coding device is embodied in such a way that the two detectors detect the first coder simultaneously when the receiving device is located in a retention position, and no more than one of the two detectors detects the second coder when the receiving device is located in a region between two adjacent retention positions.

25. The apparatus as defined in claim 24, wherein the first and second coders are detectable optically by a light barrier.

26. The apparatus as defined in claim 25, wherein a light source of the light barrier is switched off when the receiving device is located in a retention position.

27. The apparatus as defined in claim 24, wherein the first and second coders encompass slits, struts, or reflective regions that are arranged substantially transversely to the motion direction of the receiving device.

28. The apparatus as defined in claim 24, wherein a retaining device is arranged in a stationary fashion and retains the receiving device in a retention position on a mechanical basis; and wherein the retaining device encompasses a roller or ball mounted with force impingement;

wherein, as a result of the force impingement, the roller or ball presses into a locking notch provided on the receiving device, and wherein the locking notch encompasses a capture ramp.

* * * * *